United States Patent [19]
Burkin et al.

[11] 3,857,184
[45] Dec. 31, 1974

[54] MASK FOR MANUFACTURING MEMORY MATRICES

[76] Inventors: Jury Alexandrovich Burkin, Tsvetnoi proezd 29, kv. 24; Jury Emelyanovich Seleznev, Vesenny proezd, 4a, kv. 16, both of Novosibirsk, U.S.S.R.

[22] Filed: Nov. 12, 1973

[21] Appl. No.: 415,165

[52] U.S. Cl. ........ 33/174 G, 29/203 MM, 33/180 R
[51] Int. Cl. .......................... G06f 13/06, G01b 5/14
[58] Field of Search .......... 33/174 R, 174 G, 180 R; 235/92 ME, 92 MC; 29/203 MM

[56] References Cited
UNITED STATES PATENTS

| | | | |
|---|---|---|---|
| 2,734,184 | 2/1956 | Rajchman | 235/92 ME |
| 3,085,314 | 4/1963 | Leiching | 29/203 MM |
| 3,339,261 | 9/1967 | Van Der Voo | 29/203 MM |
| 3,448,777 | 6/1969 | Scheffer | 29/203 MM |

FOREIGN PATENTS OR APPLICATIONS 360,811   4/1962   Switzerland ..................... 33/180 R Primary Examiner—Louis R. Prince
Assistant Examiner—Richard R. Stearns
Attorney, Agent, or Firm—Holman & Stern

[57] ABSTRACT

The mask is made in the form of a plate with parallel rows of slots intersecting other parallel rows of slots at an angle other than a right angle. The slots are designed for pole cores to be disposed therein. At the vertices made up by the rows of slots, the slots are arranged in such a way that the axis of each pole core disposed in these slots is positioned in the direction of the bisectors of the acute angles of the parallelograms.

1 Claim, 3 Drawing Figures

MASK FOR MANUFACTURING MEMORY MATRICES

The present invention relates to computers and more particularly, to a mask for manufacturing memory matrices.

The invention may be utilized for threading memory matrices with all pole cores arranged diagonally upon one side thereof; this permits the use of toroidal pole cores of all sizes, including subminiature ones whose outer diameter may be as small as 0.5 mm.

Masks for manufacturing memory matrices are presently known, for example, such as one incorporated in a device for threading wire through matrix cores. The mask employed in this device is a plate with parallel rows of slots intersecting other parallel rows of slots at right angles, said slots being designed for pole cores to be disposed therein.

After the pole cores have been inserted into said slots of the mask, which operation is done by subjecting the mask to vibration, threading wires are introduced into the openings of the pole cores in mutually perpendicular directions corresponding to those of the intersecting rows of the slots for pole cores to be disposed therein. This mask makes it possible to employ in the memory matrices pole cores having an outer diameter as small as 0.5 mm and further permits a total number of pole cores in a memory matrix of up to 1,000 and ensures fast and reliable threading of the pole cores with a capacity for as many as four threading wires.

The known mask for manufacturing memory matrices has a disadvantage which resides in that the axes of the pole cores are arranged in the slots located at an angle of 45° to the direction of the rows of the slots and, consequently, to that of the threading wires; as a result, the pole cores have a small clearance in the openings thereof for entry of threading wires therethrough.

The small clearance in the opening of a pole core, with the axis thereof being positioned at an angle of 45° to that of the threading wire, is a major disadvantage of the known mask, which results in a lower rate of threading memory matrices, and impermissible damage possibilities to pole cores themselves and to the insulation of threading wires, as well as an unavoidable reduction in the diameter of threading wires, as compared to a maximum diameter for filling a clearance of the opening of a pole core in order to ensure a free passage of the threading wire in the course of threading. Threading wires of a smaller diameter impair the electrical parameters of a memory matrix, as well as its mechanical strength in case of overloading.

It is therefore an object of the present invention to provide a mask for manufacturing memory matrices which is simple in design and convenient in operation which would make it possible to raise labor productivity by reducing the strain upon an operator's eyes, rule out the shearing of the pole cores, keep the insulation of threading wires intact and to also permit the diameter of threading wires to be increased.

In accordance with the above and other objects, the present invention essentially consists in providing a mask for manufacturing memory matrices made in the form of a plate having slots designed for pole cores to be disposed therein, which are arranged in parallel rows intersecting other parallel rows of these slots, and wherein, according to the invention, the parallel rows of slots intersect said other parallel rows of slots at an angle other than at 90°, the said intersecting rows making up parallelograms at whose vertices the slots are arranged so that the axis of symmetry of each pole core disposed in these slots is positioned in the direction of the bisectors of the acute angles of the parallelograms.

The above design of a mask for manufacturing memory matrices reduces production costs and raises the quality of matrices due to improved electrical parameters and mechanical strength.

Other objects and advantages of the present invention will be more fully understood from the following description of preferred embodiments thereof when read in conjunction with the accompanying drawings, wherein.

Figure 1:
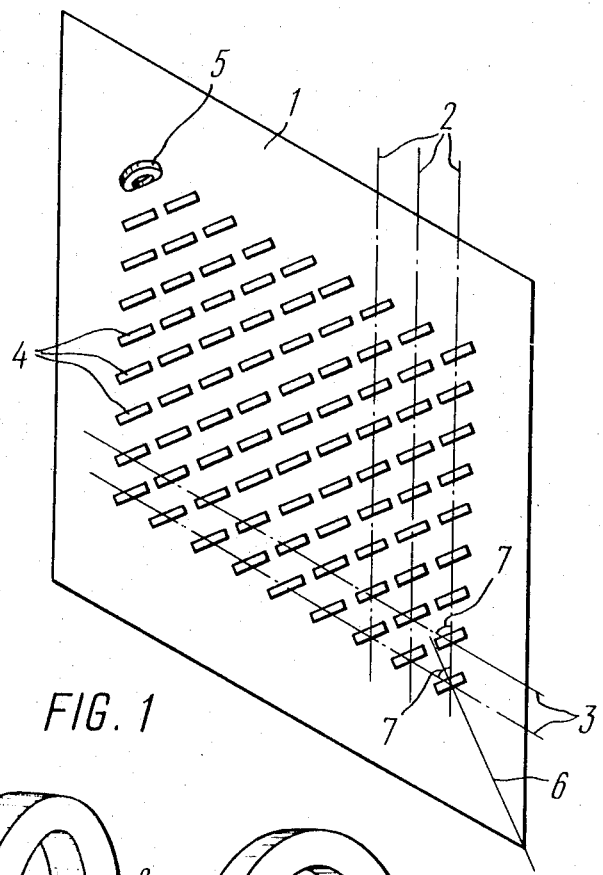
FIG. 1 is a general view of a mask for manufacturing memory matrices, in accordance with the invention.

Referring now to FIG. 1, the mask for manufacturing memory matrices comprises a plate 1, whereupon there are parallel rows 2 of slots 4 intersecting other parallel rows 3 of slots 4 at an angle other than 90°, said slots 4 are provided for the pole cores 5 to be disposed therein. The pole cores 5 are toroidal in shape. The slots 4 are made in the form of through holes in the plate 1, whose shape coincides with that of the pole cores 5, or in the form of craters having a radius corresponding to the outer diameter of the pole cores 5, or in the form of recesses.

The parallel rows 2 and 3 of the slots 4 intersect to make up parallelograms, and in the present case, rhomboid parallelograms. The slots 4 at the vertices of these parallelograms are arranged so that the axis of each pole core 5 disposed in said slots 4 is positioned in the direction of a bisector 6 of acute angles 7 of the parallelograms.

The acute angle 7, or the angle at which the parallel rows 2 intersect the parallel rows 3, should be as acute as possible. That angle, however, is limited by the dimensions of the pole cores 5 disposed at the vertices of the obtuse angles of the parallelograms. The pole cores 5, disposed at the vertices of the obtuse angles of the parallelograms, must not touch one another; in addition, the slots 4, if these are made in the form of through holes in the plate 1 of the mask, have to be positioned relative to one another in such a way so as not to impair the mechanical strength of the mask.

With such an arrangement for the pole cores 5 in the mask, before these cores are threaded, the axes of the pole cores 5 are positioned at an angle less than 45° with reference to the direction of the threading wires which are parallel to the rows 2 and that of the threading wires parallel to the rows 3.

Figure 2:
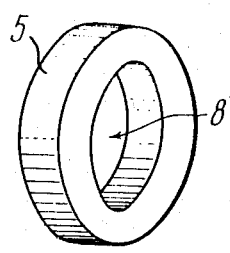
FIG. 2 shows the positioning of a pole core in relation to the threading wires in the known device.
Figure 3:
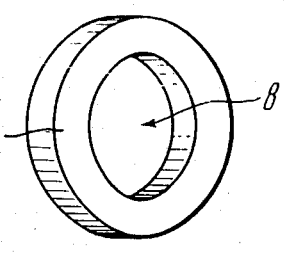
FIG. 3 shows an increased clearance in the opening of a pole core, in accordance with the invention.

FIG. 2 shows a clearance 8 in the opening of the pole core 5 when the axis of symmetry thereof is at an angle of 45° relative to the direction of the threading wires. FIG. 3 shows the clearance 8 in the opening of the pole core 5 when the axis thereof is at an angle of less than 45° relative to the direction of the threading wires. When the axis of symmetry of the pole core 5 is at an angle less than 45° relative to the direction of the threading wires the clearance 8 in the opening of the pole core 5 is greater, which feature considerably facilitates the threading of the memory matrices.

The manufacture of the memory matrices with the aid of the proposed mask for manufacturing memory matrices are considered hereinbelow.

The pole cores 5 are inserted into the slots 4 (FIG. 1) of the mask by subjecting the mask to vibrations. After that, as in the case of the known mask, the pole cores are threaded with threading wires in the direction of the rows 2 and 3. As has been already noted above, the proposed mask differs from the conventional one in that it ensures an arrangement for the pole cores 5 in the slots 4 such that the axes of pole core 5 thereof are at an angle of 45° minus half the difference between a right angle and the acute angle 7 of the parallelogram relative to the threading wires of both directions.

After the matrix has been threaded with all the appropriate threading wires, its transfer from the mask onto the working frame of the matrix is accompanied by straightening the oblique-angled matrix until an orthogonal intersection of the threading wires thereof is obtained. This does not involve any longitudinal displacement of the threading wires; the points of intersection of the threading wires are kept in place, with only the angle of intersection of the threading wires at these points being changed in the process.

The present invention allows for the ability, for manufacturing memory matrices, of threading wires of a maximum possible section in order to completely fill the clearance 8 (FIG. 2) of the opening of the pole core 5.

In addition, the invention substantially facilitates the threading of the memory matrices, relieves the strain on an operator's eyes, and improves the quality of memory matrices.

What is claimed is:

1. A mask for manufacturing memory matrices comprising a plate with slots for toroidal pole cores to be disposed therein; said slots being arranged upon said plate in parallel rows intersecting other parallel rows of slots at an angle other than a substantially 90° angle, the intersecting rows of slots making up a parallelogram; said slots at the vertices of the opposed acute angles of said parallelogram being arranged in such a way that the axis of each pole core disposed in said slots is positioned parallel to the direction of the bisectors of said acute angles.

* * * * *